US009378111B2

(12) United States Patent
Ramesh Coimbatore et al.

(10) Patent No.: US 9,378,111 B2
(45) Date of Patent: Jun. 28, 2016

(54) METHOD AND SYSTEM FOR EASY CORRELATION BETWEEN MONITORED METRICS AND ALERTS

(75) Inventors: KrishnaKumar Ramesh Coimbatore, Bangalore (IN); Dinesh Rao, Bangalore (IN)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 12/944,242

(22) Filed: Nov. 11, 2010

(65) Prior Publication Data

US 2012/0124503 A1 May 17, 2012

(51) Int. Cl.
*G06F 3/00* (2006.01)
*G06F 11/32* (2006.01)
*G06F 3/01* (2006.01)

(52) U.S. Cl.
CPC .................................. *G06F 11/328* (2013.01)

(58) Field of Classification Search
USPC ................. 715/772, 760, 854, 853, 780, 736; 709/223, 224, 227
See application file for complete search history.

(56) References Cited

U.S. PATENT DOCUMENTS

| | | | |
|---|---|---|---|
| 5,031,089 A | | 7/1991 | Liu et al. |
| 5,506,955 A | * | 4/1996 | Chen et al. ....................... 714/26 |
| 5,619,631 A | * | 4/1997 | Schott ............................ 345/440 |
| 6,128,642 A | | 10/2000 | Doraswamy et al. |
| 6,425,006 B1 | * | 7/2002 | Chari et al. .................... 709/224 |
| 6,578,009 B1 | * | 6/2003 | Shinozaki ................... 705/36 R |
| 6,782,350 B1 | | 8/2004 | Burnley et al. |
| 6,995,768 B2 | | 2/2006 | Jou et al. |
| 7,188,170 B1 | | 3/2007 | Burnley et al. |
| 7,222,786 B2 | | 5/2007 | Renz et al. |
| 7,302,502 B2 | | 11/2007 | Beg |
| 7,376,902 B2 | | 5/2008 | Lueckhoff |
| 7,587,720 B2 | * | 9/2009 | Evans ............................ 719/318 |
| 7,752,562 B2 | | 7/2010 | Mohanty et al. |
| 8,032,621 B1 | * | 10/2011 | Upalekar et al. .............. 709/223 |
| 9,135,135 B2 | | 9/2015 | Rao et al. |
| 2001/0044840 A1 | * | 11/2001 | Carleton ....................... 709/223 |
| 2002/0189267 A1 | * | 12/2002 | Singh ....................... A23G 9/00 62/126 |
| 2003/0076936 A1 | * | 4/2003 | Locke et al. ............. 379/112.01 |
| 2003/0112269 A1 | * | 6/2003 | Lentz et al. .................... 345/738 |
| 2004/0010716 A1 | | 1/2004 | Childress et al. |
| 2004/0064552 A1 | * | 4/2004 | Chong et al. .................. 709/224 |
| 2005/0071286 A1 | | 3/2005 | Laicher et al. |

(Continued)

OTHER PUBLICATIONS

"U.S. Appl. No. 11/737,919 Non-Final Office Action mailed Aug. 20, 2010", 14 Pgs.
"U.S. Appl. No. 11/737,919, Final Office Action mailed Oct. 16, 2009", 14 Pgs.
"U.S. Appl. No. 11/737,919, Non- Final Office Action mailed Jun. 8, 2009", 11 pgs.
"U.S. Appl. No. 11/737,919, Response filed Jan. 11, 2010 to Final Office Action mailed Oct. 16, 2009", 7 pgs.

(Continued)

*Primary Examiner* — Toan Vu
(74) *Attorney, Agent, or Firm* — Schwegman Lundberg & Woessner, P.A.

(57) ABSTRACT

A method and system for correlating, for at least one managed system, at least one monitored computer metric and a plurality of associated alerts, comprising selecting a monitored computer metric designated by a user, selecting a time scale designated by the user; and selecting a number of alerts associated with the monitored computer metric, the alert being designated by the user. The monitored computer metric and the number of alerts are correlated over the selected time period, and a graph of the correlated monitored computer metric superimposed with a number of alerts over the selected time period is transmitted for presentation to the user. The user can select various monitored computer metrics, various alerts and various time periods.

13 Claims, 11 Drawing Sheets

(56) References Cited

U.S. PATENT DOCUMENTS

| | | | |
|---|---|---|---|
| 2005/0108024 A1* | 5/2005 | Fawcett | G06F 17/30286 705/14.4 |
| 2005/0138425 A1* | 6/2005 | Kim | H04L 63/1441 726/4 |
| 2005/0192831 A1* | 9/2005 | Ellison | G06Q 10/00 705/7.42 |
| 2005/0192930 A1* | 9/2005 | Hightower et al. | 707/1 |
| 2005/0219151 A1* | 10/2005 | Li et al. | 345/7 |
| 2005/0228880 A1* | 10/2005 | Champlin | 709/224 |
| 2006/0117059 A1 | 6/2006 | Freeman, Jr. et al. | |
| 2006/0130142 A1* | 6/2006 | Mester et al. | 726/23 |
| 2006/0143034 A1 | 6/2006 | Rothermel et al. | |
| 2006/0200450 A1 | 9/2006 | Keane et al. | |
| 2006/0218279 A1 | 9/2006 | Yamaguchi et al. | |
| 2007/0011661 A1 | 1/2007 | Itoh | |
| 2007/0033129 A1* | 2/2007 | Coates | 705/36 R |
| 2007/0050777 A1* | 3/2007 | Hutchinson et al. | 718/104 |
| 2007/0079243 A1* | 4/2007 | Leigh et al. | 715/736 |
| 2007/0188494 A1* | 8/2007 | Agutter | G06F 17/30554 345/440 |
| 2007/0192720 A1* | 8/2007 | Alsup et al. | 715/769 |
| 2008/0086359 A1* | 4/2008 | Holton | G06Q 30/0201 705/7.29 |
| 2008/0126165 A1* | 5/2008 | Buchner | 705/8 |
| 2008/0163099 A1* | 7/2008 | Gu et al. | 715/780 |
| 2008/0163125 A1* | 7/2008 | Gu et al. | 715/853 |
| 2008/0177877 A1* | 7/2008 | Naono | G06F 11/30 709/224 |
| 2008/0263195 A1 | 10/2008 | Kroll et al. | |
| 2008/0270071 A1* | 10/2008 | Marvasti et al. | 702/179 |
| 2009/0149981 A1* | 6/2009 | Evans et al. | 700/110 |
| 2009/0210814 A1* | 8/2009 | Agrusa et al. | 715/772 |
| 2010/0229096 A1* | 9/2010 | Maiocco et al. | 715/734 |
| 2010/0268816 A1* | 10/2010 | Tarui et al. | 709/224 |
| 2010/0318931 A1* | 12/2010 | Boykin et al. | 715/771 |
| 2012/0117493 A1* | 5/2012 | Gu et al. | 715/760 |
| 2014/0005979 A1 | 1/2014 | Rao et al. | |
| 2015/0116333 A1* | 4/2015 | Harper | A61B 5/14532 345/440 |

OTHER PUBLICATIONS

"U.S. Appl. No. 11/737,919, Response filed Jun. 26, 2009 to Non Final Office Action mailed Jun. 8, 2009", 11 pgs.

"U.S. Appl. No. 11/737,919 , Response filed Jul. 1, 2011 to Final Office Action mailed Apr. 7, 2011", 7 pgs.

"U.S. Appl. No. 11/737,919, Final Office Action mailed Apr. 7, 2011", 13 pgs.

"U.S. Appl. No. 11/737,919, Non Final Office Action mailed Feb. 2, 2012", 14 pgs.

"U.S. Appl. No. 11/737,919, Response filed Jun. 4, 2012 to Non Final Office Action mailed Feb. 2, 2012", 9 pgs.

"U.S. Appl. No. 11/737,919, Response filed U.S. Appl. No. 11/737,919, Response filed Jan. 20, 2011 to Non Final Office Action mailed Aug. 20, 2010", 8 pgs.

U.S. Appl. No. 13/536,459, filed Jun. 28, 2012, Method and System for Auto-Adjusting Thresholds for Efficient Monitoring of System Metrics.

"U.S. Appl. No. 11/737,919 , Appeal Brief filed Jul. 1, 2013", 25 pgs.

"U.S. Appl. No. 11/737,919, Advisory Action mailed Apr. 1, 2013", 3 pgs.

"U.S. Appl. No. 11/737,919, Examiners Answer mailed Oct. 25, 2013", 21 pgs.

"U.S. Appl. No. 11/737,919, Final Office Action mailed Nov. 29, 2012", 14 pgs.

"U.S. Appl. No. 11/737,919, Reply Brief filed Dec. 9, 2013", 14 pgs.

"U.S. Appl. No. 11/737,919, Response filed Feb. 28, 2013 to Final Office Action mailed Nov. 29, 2012", 15 pgs.

"U.S. Appl. No. 13/536,459, Examiner Interview Summary mailed May 8, 2015", 3 pgs.

"U.S. Appl. No. 13/536,459, Non Final Office Action mailed Mar. 26, 2015", 10 pgs.

"U.S. Appl. No. 13/536,459, Notice of Allowance mailed Jul. 23, 2015", 7 pgs.

"U.S. Appl. No. 13/536,459, Response filed Jun. 24, 2015 to Non Final Office Action mailed Mar. 26, 2015", 10 pgs.

* cited by examiner

| SYSTEM ID | TYPE | INSTALLATION NUMBER | PRODUCT INSTANCE | PRODUCT VERSION |
|---|---|---|---|---|
| C60 | APPLICATION SERVER JAVA, APPLICATION SERVER ABAP | N/A, 0020540341 | CRM APPLICATION SERVER JAVA, CRM APPLICATION SERVER ABAP | EHP1 FOR SAP CRM 7.0, EHP1 FOR, SAP CRM 7.0 |
| C60 | APPLICATION SERVER JAVA, APPLICATION SERVER ABAP | N/A, 0020540341 | CRM APPLICATION SERVER JAVA, CRM APPLICATION SERVER ABAP | EHP1 FOR SAP CRM 7.0, EHP1 FOR, SAP CRM 7.0 |
| B4X | APPLICATION SERVER ABAP, APPLICATION SERVER JAVA | 0020270862 | APPLICATION SERVER ABAP, APPLICATION SERVER JAVA | SAP NETWEAVER 7.3, SAP NETWEAVER 7.3 |
| B4Y | APPLICATION SERVER ABAP, APPLICATION SERVER JAVA | 0020270862 | APPLICATION SERVER ABAP, APPLICATION SERVER JAVA | SAP NETWEAVER 7.3, SAP NETWEAVER 7.3 |
| BXV | APPLICATION SERVER ABAP, APPLICATION SERVER JAVA | 0020270862 | APPLICATION SERVER ABAP, PI ADAPTER ENGINE (JAVA EE) | SAP NETWEAVER 7.3, SAP NETWEAVER 7.3 |
| SMQ | APPLICATION SERVER ABAP, APPLICATION SERVER JAVA | 0020270862 | SOLUTION MANAGER ABAP STACK, SOLUTION MANAGER JAVA STACK | SAP SOLUTION MANAGER 7.0 EHP1, SAP SOLUTION MANAGER 7.0 EHP1 |
| U8R | APPLICATION SERVER JAVA, APPLICATION SERVER ABAP | N/A | APPLICATION SERVER JAVA, APPLICATION SERVER ABAP | SAP EHP1 FOR SAP NW PI 7.1, SAP EHP1 FOR SAP NW PI 7.1 |
| IWC | APPLICATION SERVER ABAP, APPLICATION SERVER JAVA | 0020283901 | BUSINESS INTELLIGENCE, ENTERPRISE PORTAL | SAP EHP1 FOR SAP NETWEAVER 7.0, SAP EHP1 FOR SAP NETWEAVER 7.0 |
| LAB | APPLICATION SERVER ABAP, APPLICATION SERVER JAVA | 0020230702 | SOLUTION MANAGER ABAP STACK, SOLUTION MANAGER JAVA STACK | SAP SOLUTION MANAGER 7.0 EHP1, SAP SOLUTION MANAGER 7.0 EHP1 |
| MOM | APPLICATION SERVER ABAP | SAP-INTERN | APPLICATION SERVER ABAP, PROCESS INTEGRATION | SAP NETWEAVER 7.3 |

LAST REFRESH: 22.09.2010 06:44:45 CET   REFRESH

FIG. 2

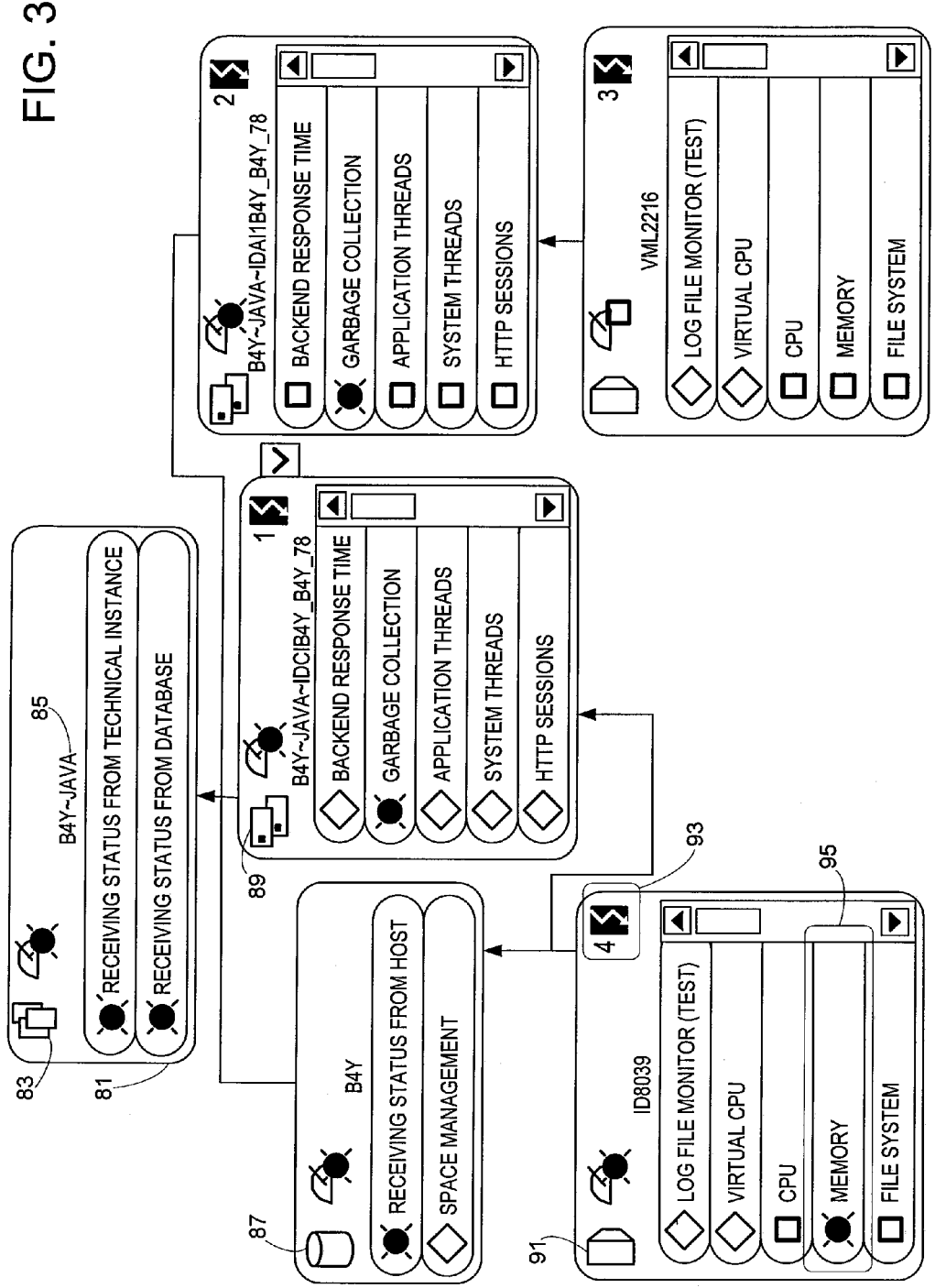

FIGURE 3 INTERFACE

FIGURE 4 INTERFACE

FIG. 4A

METHOD AND SYSTEM FOR EASY CORRELATION BETWEEN MONITORED METRICS AND ALERTS

RELATED APPLICATION

The present application is related to U.S. patent application Ser. No. 10/868,011 entitled "Performance Monitoring," owned by the assignee of this application, which application is incorporated herein by reference.

FIELD

The present disclosure relates generally to computer performance monitoring. In one embodiment, the disclosure relates to methods and systems for correlating computer metrics with alerts.

BACKGROUND

There is monitoring information in computer systems that depicts the health of the system, and alerts that denote important and urgent actions. Typically, a user would like to know the status of various monitored computer metrics at the time when an alert occurred, or the number of alerts that occurred during periods when the metrics are being monitored. This might enable better diagnosing of a problem and may also indicate a possible resolution mechanism.

There can be various sources within a system from where monitored computer metrics and alerts are obtained. Depending on the complexity of the system, it could be very challenging for a user to correlate monitored computer metrics with alerts. At times, the user has to rely on his or her experience to map various parameters and draw a conclusion.

BRIEF DESCRIPTION OF DRAWINGS

The present disclosure is illustrated by way of example and not limitation in the figures of the accompanying drawings, in which like references indicate similar elements and in which:

FIG. 2 is an illustration of a system monitoring view of a technical monitoring work center in a computer system, in which an example embodiment can be implemented, depicting various systems that can be selected for monitoring;

FIG. 3 is an illustration of details of a system of FIG. 2 that a system administrator selects for monitoring;

FIG. 4A illustrates an example of how FIG. 3 and FIG. 4 may be displayed together;

DETAILED DESCRIPTION

The description that follows includes illustrative systems, methods, techniques, instruction sequences, graphical user interfaces, and computing machine program products that embody illustrative embodiments discussed herein. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide a method and system for correlating, for at least one managed system, monitored computer metrics and alerts associated with the monitored computer metrics, comprising selecting a monitored computer metric designated by a user, selecting a time scale designated by the user, and selecting a number of alerts associated with the monitored computer metric, with the alert being designated by the user. The monitored computer metric and the number of alerts are correlated over the selected time period, and a signal representing a graph of the correlated monitored computer metric superimposed with a number of alerts over the selected time period can be transmitted for presentation to the user-administrator. The user can select various monitored computer metrics, alerts and time periods. Stated another way, embodiments discussed herein represent monitored metrics and alerts in a unified user interface based on the dimension of time.

Figure 1:
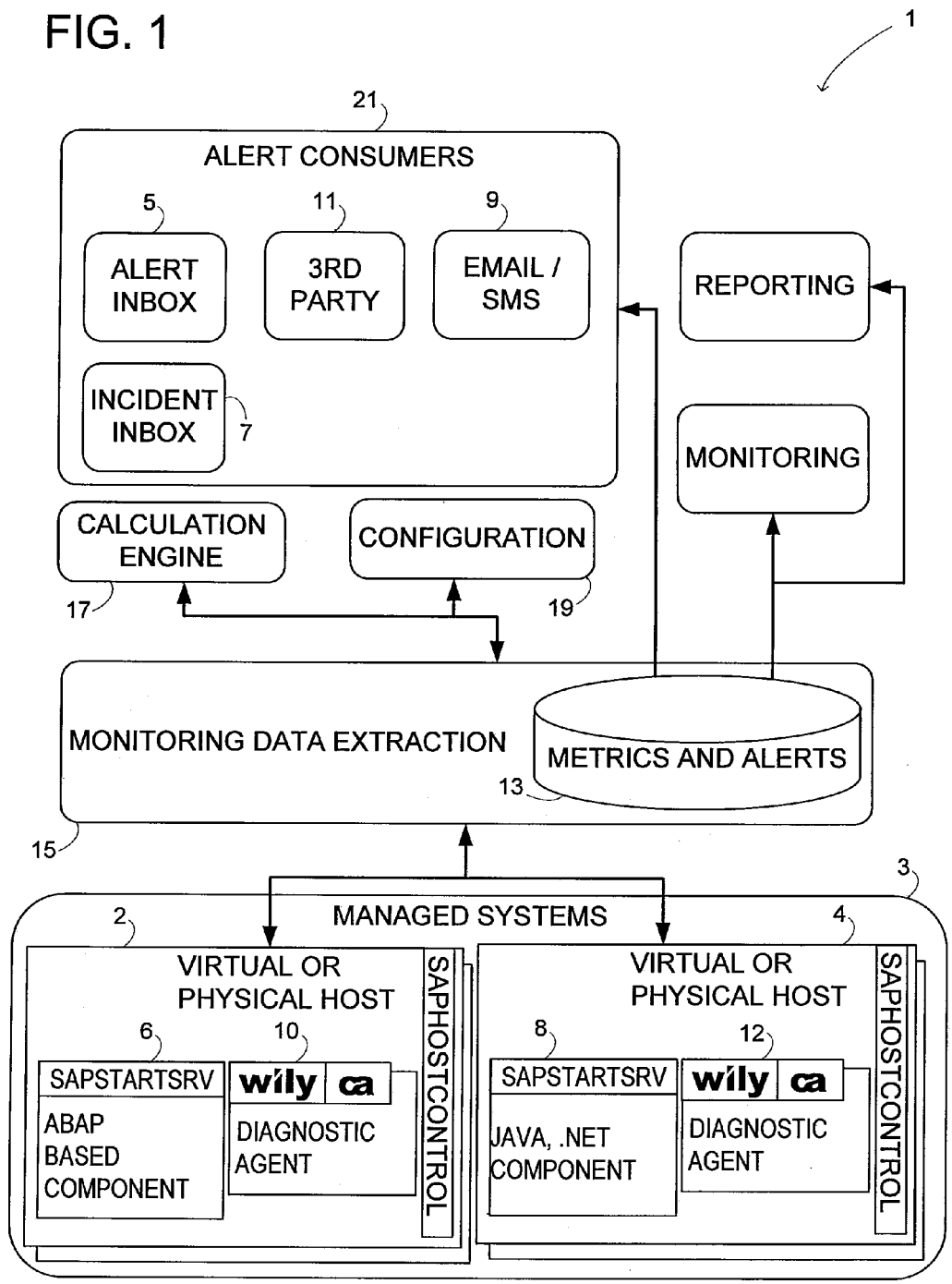
FIG. 1 is an illustration of a functional block diagram of a computer system from which an example embodiment can be launched.

While many systems may be used to implement the embodiments described herein, one exemplary system is seen in FIG. 1 in which the embodiment under discussion may be implemented. Functions needed for operation of these embodiments are known and can be seen in pending U.S. patent application Ser. No. 10/868,011 entitled "Performance Monitoring," described above as a Related Application.

FIG. 1 illustrates a diagram of a system monitoring infrastructure 1. This can be viewed as a work center. The system monitoring infrastructure 1 is that of SAP Solution Manager, explained subsequently. It will be appreciated that other monitoring infrastructures can be used. Managed systems 3 are the monitored systems associated with a customer site. These systems could be running advanced business application programming (ABAP) like in SAP ECC, or Java like in SAP NetWeaver Portal, or other systems like SAP master data management (MDM), text retrieval and information extraction (TREX), and the like. Managed systems 3 can be connected to infrastructure 1 during initial setup. As mentioned above, one example of infrastructure 1 can be SAP Solution Manager, currently publicly available. Monitoring data is collected on the managed systems 3 using agents. The agents periodically communicate with infrastructure 1. Managed systems 3 may include virtual or physical hosts 2 and 4, each of which may use an instance agent. SAPStartsrv 6 and 8 are shown as the instance agents, although others may be used. SAPstartsrv is available for administering and monitoring hosts and SAP instances and has a variety of Simple Object Access Protocol (SOAP) interfaces, with which the service can be used by remote clients. Remote clients might include a SAP Management Console used as a user interface for administration display and for monitoring, diagnosing, and/or adjusting parameters of one or more of the managed systems 3. An extended diagnostics application by CA Wily 10, 12, is shown as a diagnostic application that may be used, although other diagnostic applications may be used as well.

Monitoring data extraction module 15 is a generic framework that is capable of extracting monitoring data from the managed systems 3, whether they are ABAP, Java or others. This monitoring data extraction module 15 communicates with the agents running on managed systems 3 to collect monitoring data.

Calculation engine 17 is a runtime component that applies thresholds and rules on the collected metrics to calculate end-user alerts. As only one example, the calculation engine 17 may calculate how many problem events occur over a given time period and issue an alert when the number of events surpasses a threshold number. The calculation engine 17 may also be used to correlate computer metrics and alerts over time. As one example, the calculation engine may count the number of alerts occurring during a given time period and relate that number to the behavior of the computer metric over the same time period. The correlated monitored computer metrics and alerts may then be displayed to an administrator at the above user interface as discussed below with respect to FIGS. 6-8. Alternatively, a representation of the monitored computer metrics and the number of alerts can be routed to the user for correlation and display.

Alert Consumers module 21 is a set of alert consumers, which may be resident on separate client machines or on separate computer systems. Alert Consumers module 21 is a runtime component that routes the end-user alerts to the appropriate consumers, or users, for display on an end user interface. Alert Consumers module 21 can be viewed as a work center. A work center can allow system administrators to manage all of their administrative tasks centrally from one single point of control. Recurring administration tasks can be listed for each system of a solution with their status and their execution frequency (such as hourly, daily, weekly and monthly). Generally, this approach can be viewed as bundling role-based content with task-specific authorizations and a Web-based user interface. Work centers can deliver the functionality, components, and tools needed to manage a system's entire landscape throughout the IT lifecycle. For example, the tasks that administrators need to perform in their daily operations can be assembled in easy-to-use work centers for, as examples, System Landscape Management, System Administration and System Monitoring.

One of the alert consumers is the alert inbox 5 where alerts are visible. This can be the default consumer in infrastructure 1. Alert inbox 5 offers functionality to view and analyze further details of the alert and offer some guidance on issue resolution. Other alert consumers could be incident inbox 7, Email/SMS 9, and 3rd party alert inbox 11. These are alert consumers as used in the SAP solution manager, although other alert consumers can be used. As an example of usage of the foregoing alert consumers, there is a possibility, when an alert occurs, of automatically sending it to inbox 5 or to Email/SMS 9. There may also be a possibility to forward an alert automatically or manually to incident inbox 7, which could be a service desk. Third party tools for 3rd party alert box 11 may be HP Open View or IBM Tivoli, which can also consume alerts.

Metrics and Alerts storage 13 is a repository in infrastructure 1 that may contain the collected metrics from managed systems 3 and calculated end-user alerts from calculation engine 17. The monitoring data extraction module 15 collects metrics from managed systems 3 and stores them in Metrics and Alerts storage 13. The calculation engine 17 evaluates these metrics against thresholds and rules to generate end-user alerts, which can be stored in Metrics and Alerts storage 13.

Configuration component 19 is a design time component that describes monitoring meta data. It can be a central component that instructs the monitoring data extraction module 15 which metrics to collect, from which systems to collect, the frequency of metric data collection, and the like. It also provides the calculation engine 17 with information such as thresholds and rules (average, worst case, and the like). It instructs alert consumers module 21 on which is the appropriate alert consumer, i.e., whether to send to email/SMS 9, or the other alert consumers, or whether auto-reaction is needed, and the like. Auto-reaction is a function that allows the system to react automatically to an alert. The user can define auto reaction methods.

FIG. 2 illustrates a work center in which one embodiment can be implemented. The work center shown in FIG. 2 is a work center in infrastructure 1 (shown in FIG. 1) that helps a system administrator monitor the health of the system landscape. However, any number of additional work centers can be used. In the example of FIG. 2, there is an illustration of a System Monitoring view, which is one of the views in the work center offering a view of the current state of the system. It shows metrics and alerts for a selected system in a graphical way. This view can be opened or selected, using a navigation pane (not shown) by a system administrator to allow the administrator to monitor, diagnose and improve operations within the system. In the illustrated view, the system administrator has selected the System Monitoring view of the work station by, for example, clicking that function on a navigation pane (not shown). A pre-defined set of queries 50A-50E are exemplary queries that help filter different systems in the customer landscape. The current selection illustrated in FIG. 2 refers to query "All Systems" 50 A, although any of the other four systems, 50B-50E, could be selected. In selecting "All Systems" 50A, the administrator can select any of All Systems ID 53, along with the system type 55, installation number 57, product instance 59 and product version 61, which are listed for view by the administrator. The administrator can select a set of systems he or she is interested in. System monitoring button 63 offers a possibility to view monitoring details of the selected systems in the current window or a new window.

In operation, and following the illustration of FIG. 2, the administrator is taken to the details of the selected system by selecting one of the systems listed in System ID 53 as the desired system to monitor. For example, the administrator can select System B4Y, which could be application servers for JAVA and ABAP. That is, B4Y can be a dual stack system and hence, it could have both ABAP and JAVA. In the illustration, the administrator can select Application Server JAVA, with Product Version SAP NETWEAVER 7.3, SAP. The administrator will then be able to view which functions are occurring in that server.

Figure 4:
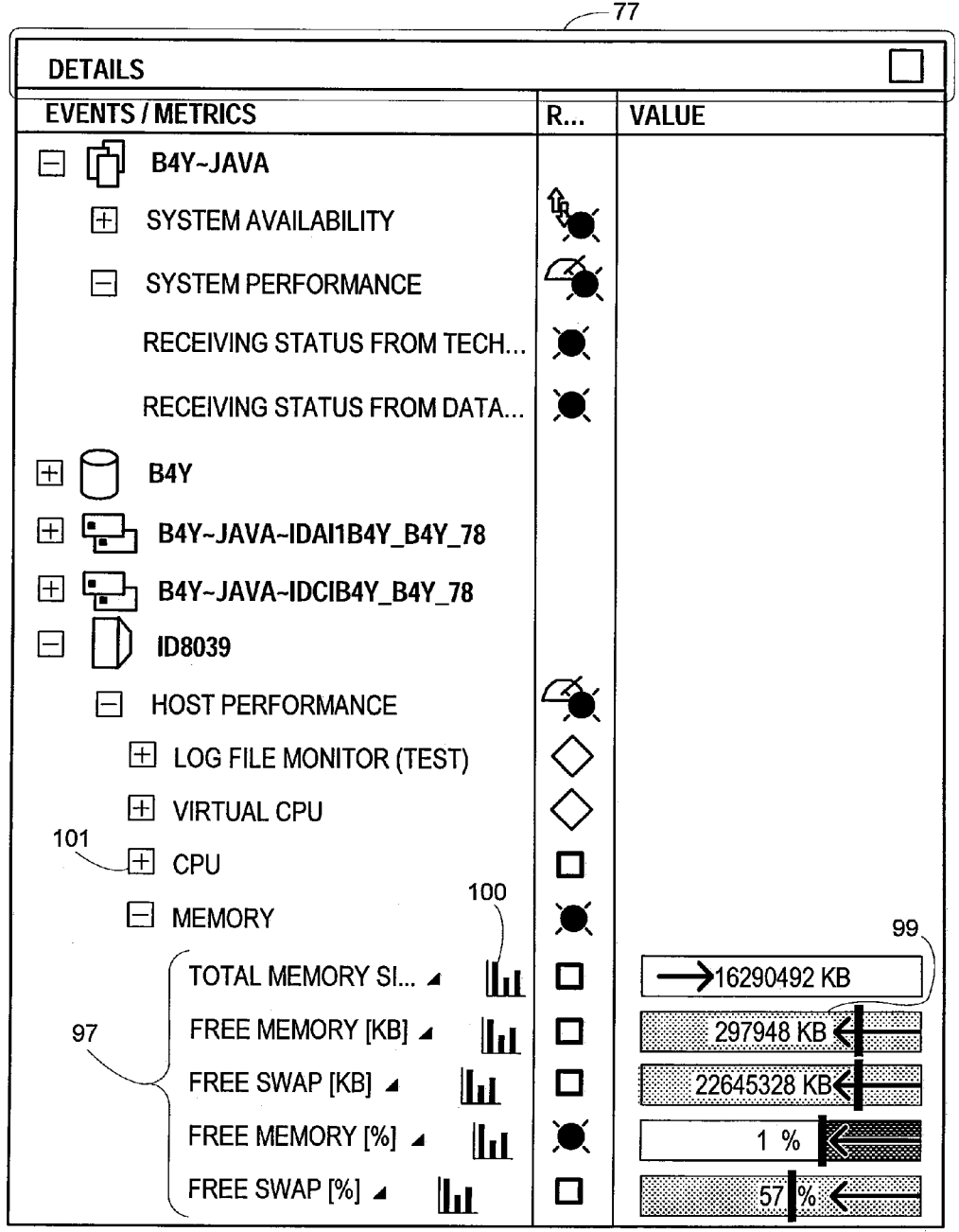
FIG. 4 is a navigation pane for FIG. 3.

FIG. 3 may be displayed with FIG. 4 as shown in FIG. 4A. FIG. 4 is a navigation pane for the user interface of FIG. 3. Together, FIG. 3 and FIG. 4 illustrate system monitoring details for different components of the above selected system and the status of different metrics of those components. Not shown is a well known refresh frequency of the application, which can be configurable. A refresh frequency of every five minutes, as one example, can be used. Other frequencies may be selected by the administrator. Also not shown is the usual "bread crumb" for navigation. FIG. 3 gives an overview of the system components and hierarchy, including events like a collection of metrics evaluated together, explained in additional detail below. Event and metric details, selectable by the administrator by clicking, are shown at the navigation pane of FIG. 4. These can include ratings (color coded red, yellow, green, or grey, if desired) to show an event, event status, metric, metric value, and threshold. In one example, if there were a red/yellow status of a metric at Host 91 in FIG. 3, it would mean the metric can be propagated to a higher layer (for example, Instance 89 to Technical System 83). The Receiving Status lines represent the status of the receiving event from the below layer. This can be evaluated along with other metrics that are measured in the same layer. What is happening on Database and Instance can be checked by opening the tree under B4Y (cylinder icon in FIG. 3) and B4Y-JAVA-LDAI1_B4Y_78 or B4Y-JAVA-LDCI1B4Y_B4Y_78. System availability and performance can be two categories under which metrics could be grouped. There can also be exception (short dumps, thread dumps) and configuration (alerts due to configuration changes) under which certain metrics can be grouped. It is possible for the administrator to switch categories by clicking or other selection. For example, monitoring data can be divided into categories, such as availability (like system or host availability), configuration (like profile parameter changes), exception (like thread dumps and ABAP short dumps) and performance (like CPU utilization, memory, and the like). For example, icon 81 can indicate that performance of Technical System B4Y-JAVA is red, which means that the system is experiencing performance bottlenecks. This could be due to the system itself or its underlying components, such as Instance, Database, or Host. Technical System 83 can indicate that the box represents a Technical System. The name of the component (in this case a Technical System) is B4Y-JAVA, which is the system the Administrator selected, as discussed above with respect to FIG. 3. Icon 87 can indicate that the box represents a Database Instance, in this case Database B4Y. Instance 89 can indicate that the box represents a Technical Instance. A Technical Instance is a way to scale out the system. Each instance gets allocated system resources such as memory, processes, and the like. When the number of users in a system increases, it is normal to add a new Host and instance to a system such as the SAP system used as an example. With this, half of the user requests can be handled by the second instance. Host 91 can indicate that the box represents a host or server. Icon 93 can indicate the total number of alerts on the component (in this case it shows that four alerts are present on host 1D8039). Icon 95 can indicate an event and its rating.

As can be seen at 97 in FIG. 4, there can be many metrics for memory. These can be grouped together and evaluated based on a rule. The result of this evaluation is the rating seen at the event "Memory." An event can be configured at design time by grouping together multiple metrics based on a rule such as average, worst case, and the like. It can be evaluated at runtime, based on the rule, to arrive at a rating. FIG. 4 illustrates a list of metrics 97 for a host that can be grouped under the event "Memory." In FIG. 4, under B4Y-JAVA, two categories are shown defined. These are Availability and Performance. When a user opens one of those nodes, the user can see events and metrics that are defined for that category. For Performance, no metrics are defined at the Technical System Layer for the SAP system used as an example. Instead, its status is determined by the status of the underlying Layer, Instance and Host. Hence, as illustrated, the system has only Receiving Status from Instance and Host, although many different combinations may be used. The metric value 99 can be color coded to indicate a rating based on the threshold. The vertical lines (which can be color coded red and yellow in the next example below) are indications of threshold values for the metric. If a particular metric exceeds a threshold, it can get a yellow or red rating depending on the actual threshold. A red/yellow metric can result in turning an event red/yellow, which could result in an end-user alert. The presence of icon 100 indicates that historical values are available (in Business Intelligence (BI)) for that metric. The icon is clickable and a BI-based report can be launched with the historical values for the metric.

Figure 5:
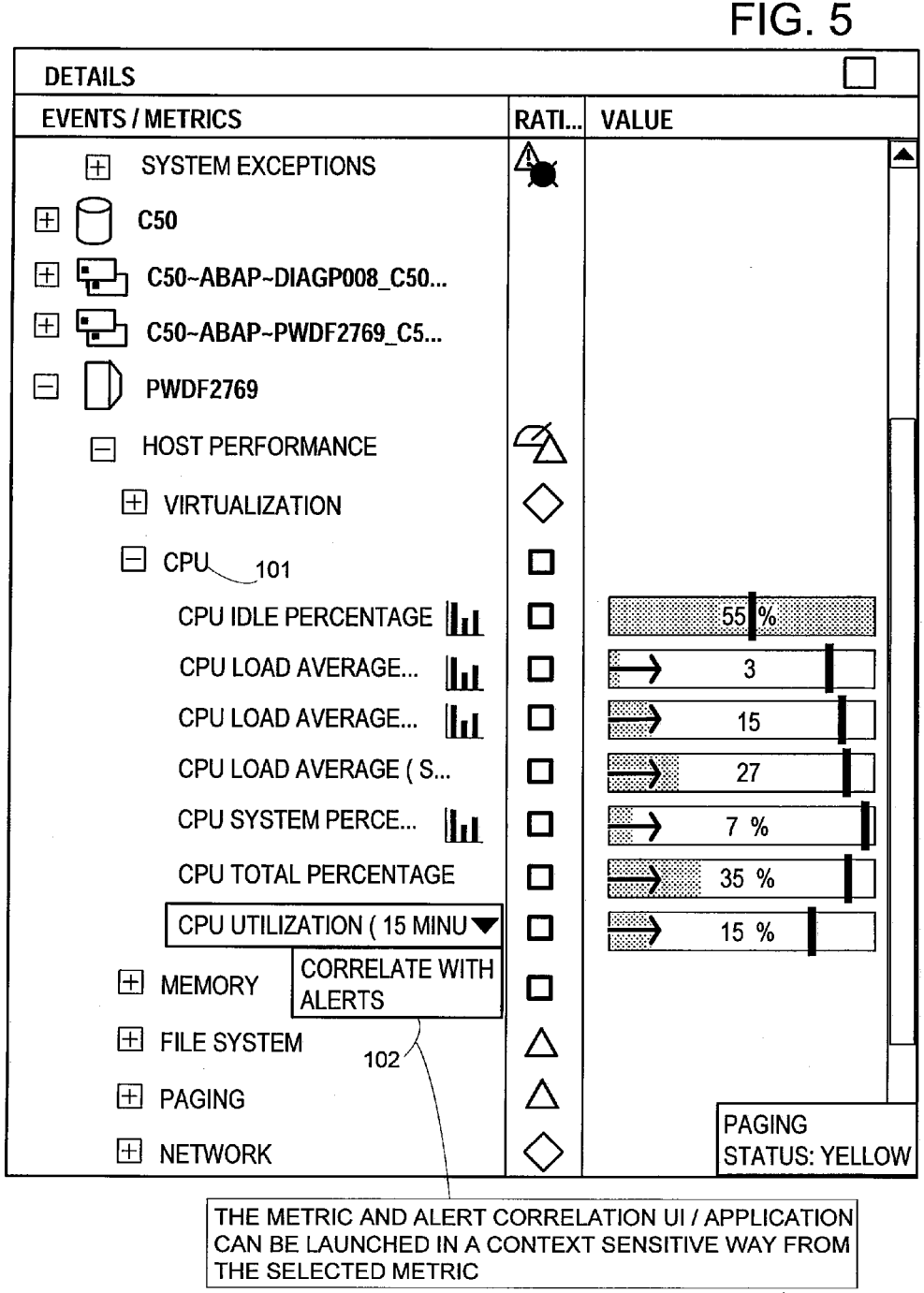
FIG. 5 is an illustration similar to FIG. 3 that includes additional context.

FIG. 5 is substantially FIG. 3 but with context added. For example, when clicked, the CPU icon 101 can display a drop-down list. As indicated in the drop-down list on the figure, the CPU metrics of a host is shown in a monitoring application, for example, the SAP Solution Manager. When the administrator notices a situation that needs further investigation (in this case, CPU Utilization), he or she can open the context menu 102 available for that metric. In the dropdown menu item "Correlate with Metrics," the administrator is provided an option that offers a possibility to correlate this metric to alerts in a given time frame. This correlation is done as explained below with respect to FIG. 6, or in any other method of choice.

Figure 6:
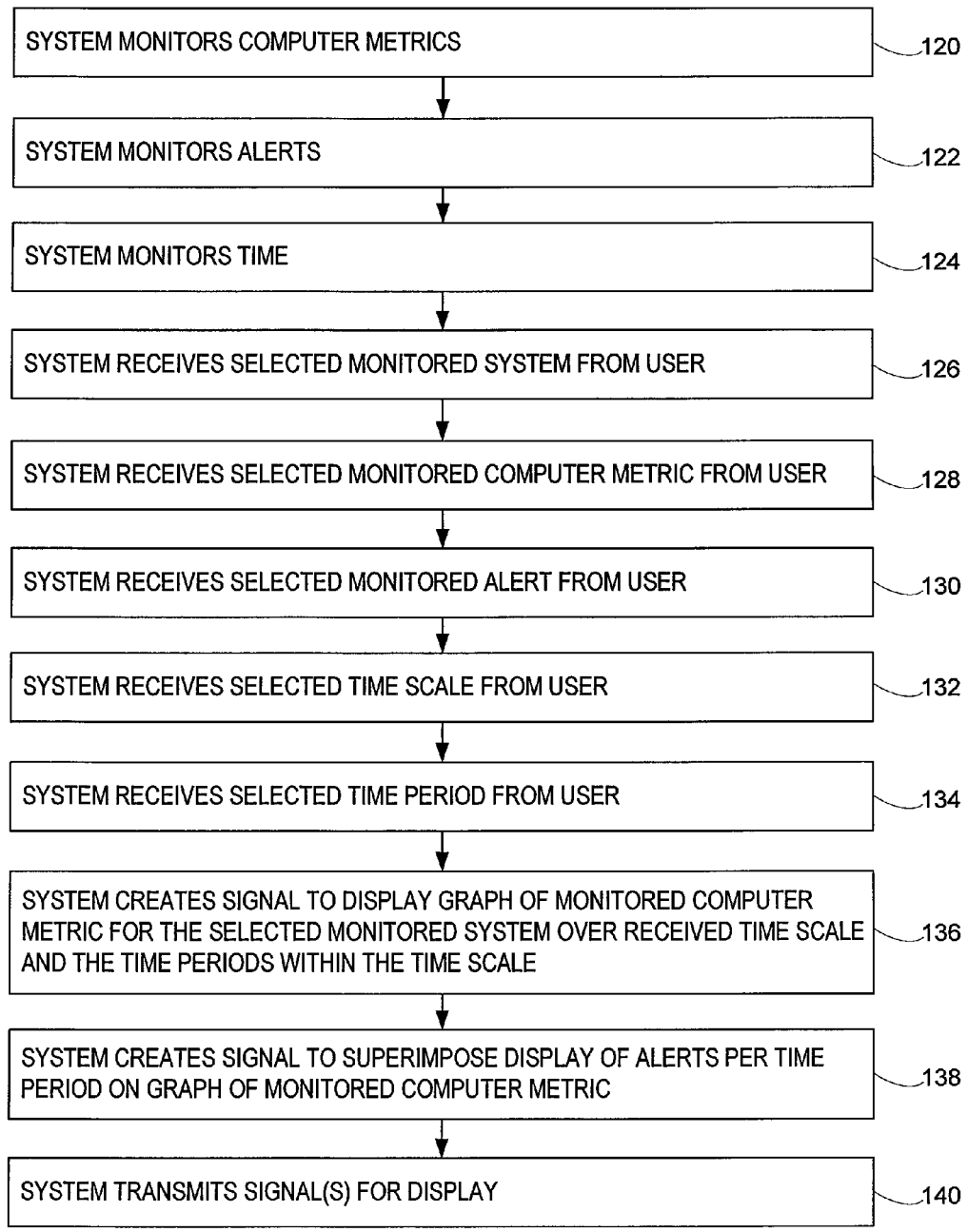
FIG. 6 is a flow chart of an operation of one embodiment.

FIG. 6 illustrates a flow chart of one embodiment discussed herein. As mentioned previously, there are various subsystems or components that are being monitored by the monitoring system in the embodiment under discussion. As seen at 120, the monitoring system monitors computer metrics of each system or of a subset of systems, according to the designer's choice.

The monitoring system also monitors alerts for the monitored metrics at 122. As discussed previously, an alert can be registered for a monitored metric when calculation engine 17 of infrastructure 1 in FIG. 1 applies thresholds and rules on the collected metrics to calculate end-user alerts. As one example, the calculation engine 17 may calculate how many problem events occur in a monitored metric over a given time period and may issue an alert when the number of events surpasses a threshold number. This is merely one example of how alerts can be registered, and it will be appreciated that alerts can be registered in other ways as well. The monitoring system also monitors time, as at 124 in FIG. 6, so that the system can correlate monitored computer metrics and alerts over time. The user can then monitor the behavior of selected systems over time. For example, the user can select a system to be monitored and transmit that information to the monitoring system. The system receives the selection of the system the user wishes to monitor at 126. The user can also select the computer metric that is desired to be monitored in the selected system and send that information to the monitoring system where it is received at 128. The user sends the particular alert the user would like to monitor to the monitoring system, where it is received at 130. The three foregoing transmissions can be done individually, in the same transmission, or in any manner desired. The user does the same for the time scale and for the time periods within the time scale. As one example, the user might select the last hour for the time scale and every five minutes for the time period within the selected time scale. The system will receive the selected time scale from the user at 132 and will receive the selected time period from the user at 134. While this is shown as the time scale and the time period being received in two separate transactions, it will be appreciated that this can be done in a single transaction as well, or could also be combined with the sending of any or all of the selected systems, computer metrics, and alerts at 126, 128 and 130.

Upon receipt of the information from the user, the monitoring system of FIG. 6 generates, at 136, a signal to display a graph of the monitored computer metric for the selected monitored system over the selected time scale and for the selected time periods within the selected time scale. In addition, at 138, the system creates a signal to superimpose the display of alerts per time period on the graph of the monitored computer metric for the selected system. While these signals are shown as being generated separately, those skilled in the art will recognize that they can be generated in one function. At 140, the monitoring system then transmits the signal or signals comprising the graph for the purpose of display.

Figure 7:
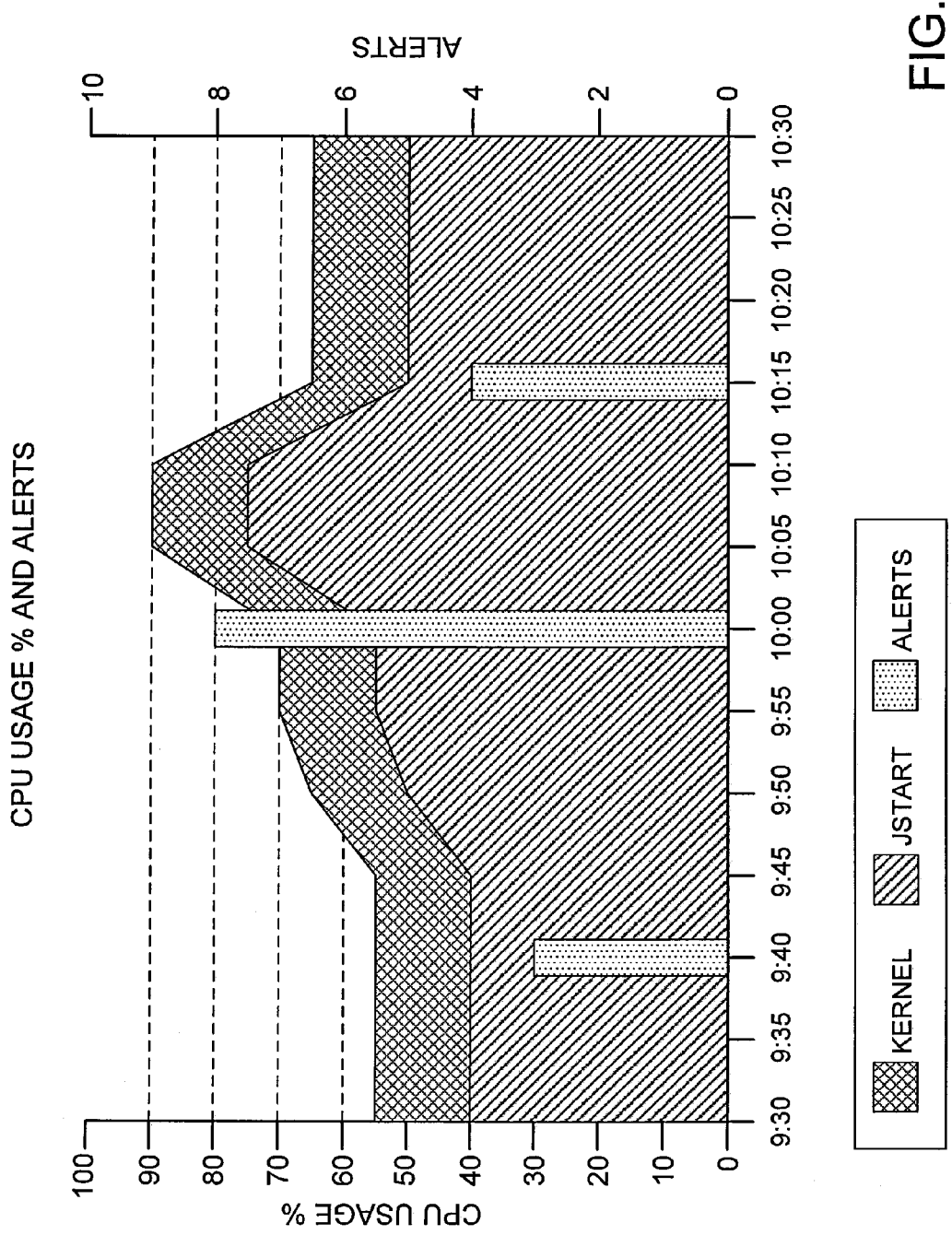
FIG. 7 illustrates a user interface displaying a graphical illustration of a correlation of monitored computer metrics and summed up alerts, in accordance with an example embodiment.
Figure 9:
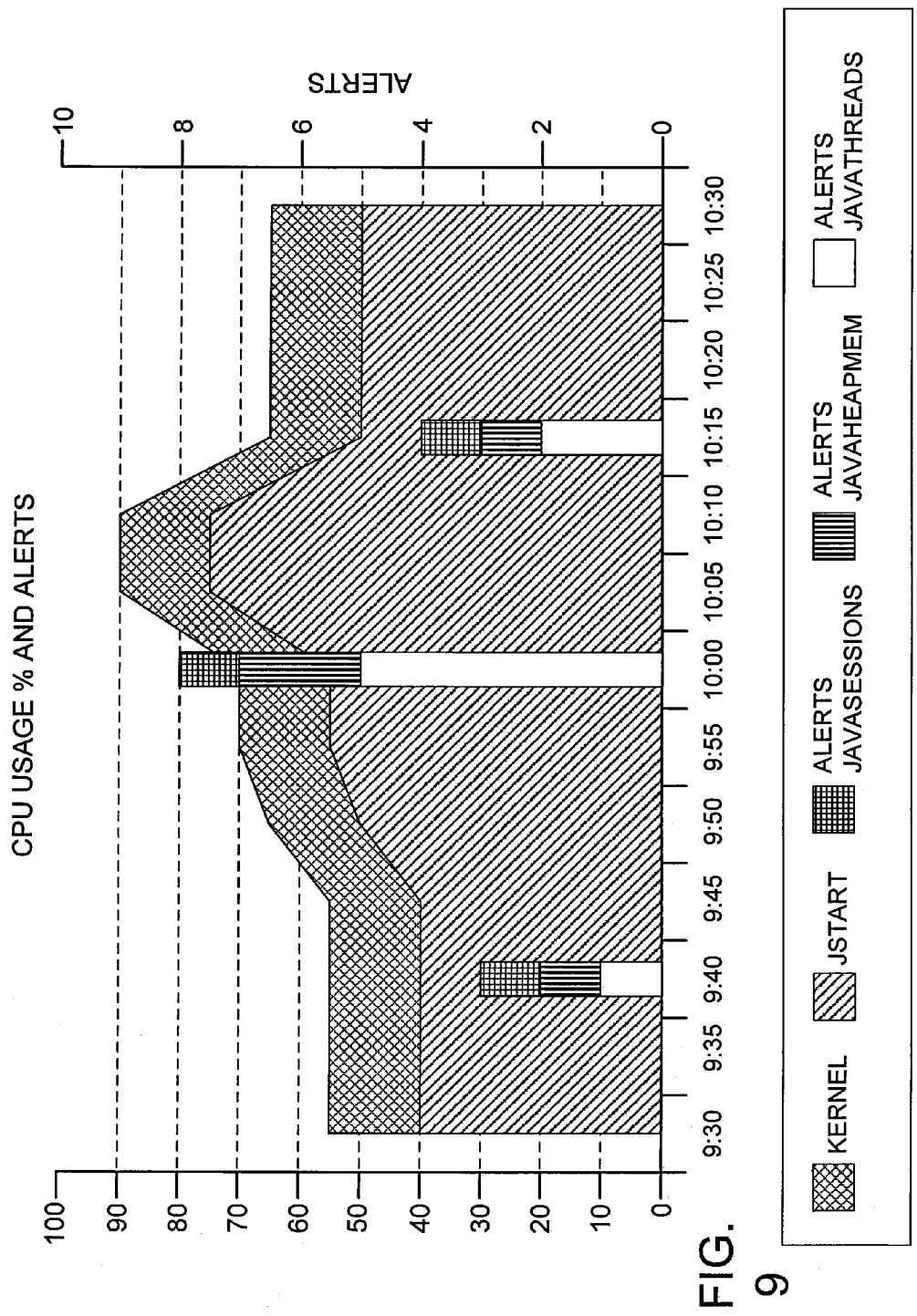
FIG. 9 illustrates a user interface displaying still another graphical illustration of a correlation of monitored computer metrics and alerts, in accordance with an example embodiment, where the alerts from the individual sources can be stacked one on top of another.

FIG. 7 illustrates the selected monitored computer metric and selected alert information in one graph for a selected system, such as a KERNAL or a JSTART. The selected time scale is the last hour and the selected time period is every five minutes. The selected computer metric is percent computer usage. The alerts in the selected computer metric can be summed up and depicted as seen in FIG. 7. Alternatively, the alerts can be stacked one on top of another as in FIG. 9.

Figure 8:
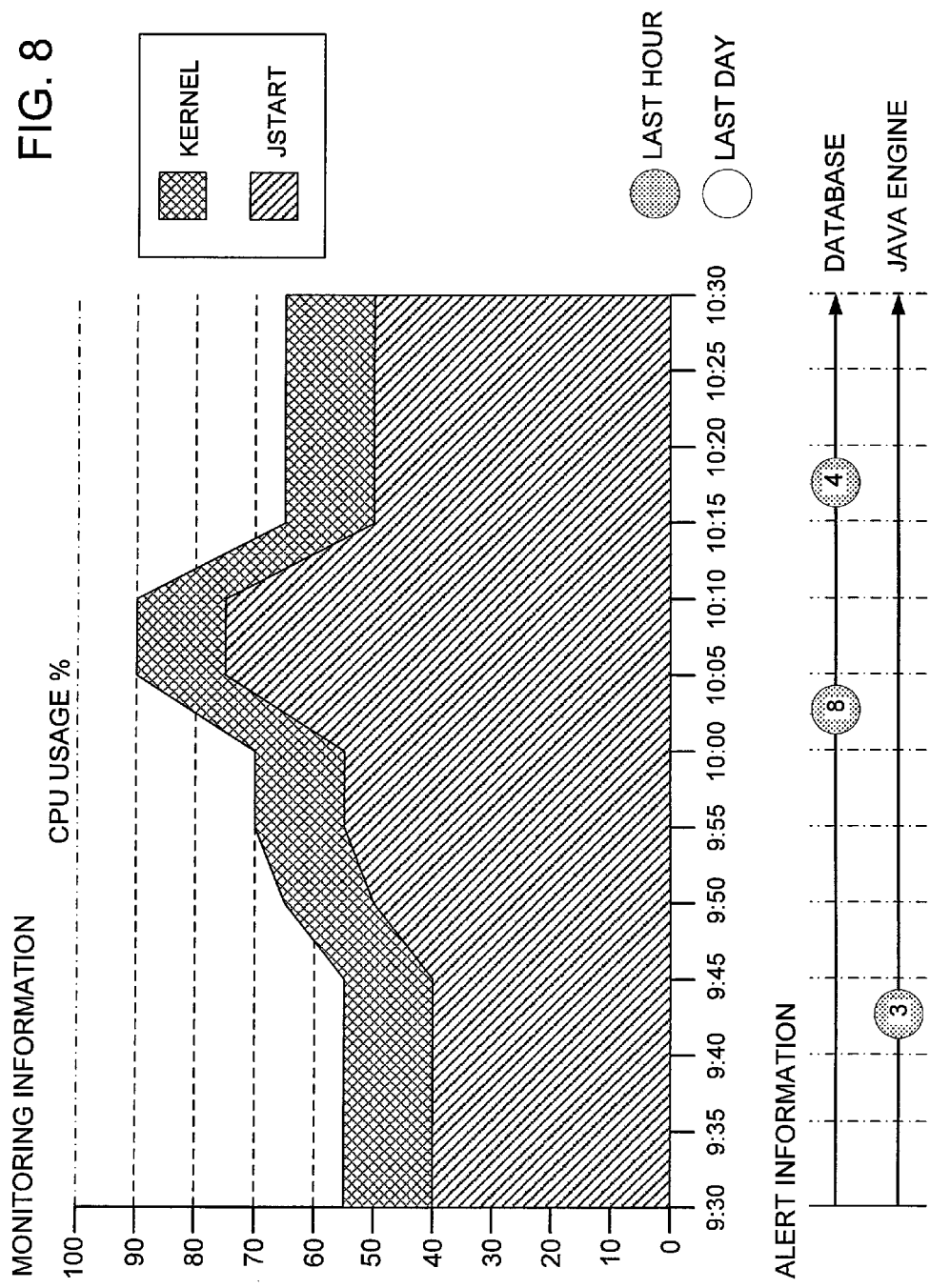
FIG. 8 illustrates a user interface displaying another graphical illustration of a correlation of monitored computer metrics and alerts, in accordance with an example embodiment, where the monitoring information and the alert information are depicted in separate panels.

FIG. 8 depicts the monitoring and alert information in two panels on the user interface. In the upper part of FIG. 8, the selected monitoring information is depicted. The monitoring information can be on a continuous time interval, for example, the last hour or the last day. The time scale selected in FIG. 8 is for the last hour, the time period is every five minutes, and the selected monitored metric information is the percent CPU Usage metric. The administrator can select the metric of choice, and this could also be memory usage, network statistics, or any other metric of interest. The monitoring information can be depicted using graphs or stacked charts as mentioned above. The user has the option of clicking on and choosing the various sources in FIG. 2 and FIG. 3 to look at their corresponding graphs. In the lower part of the user interface of FIG. 8, the selected alert information is depicted. This is shown using the time axis and corresponds to the time selected for the monitoring information (for example, the last hour, as mentioned above). The alerts are segregated, for the example of FIG. 8, for selected time buckets of five minute intervals, and their count is depicted on the time axis. The alerts information selected is for the Database and for the JAVA engine, which are the selected systems. There are three alerts illustrated for the JAVA engine between 9:40 and 9:45, eight alerts for the Database between 10:00 and 10:05, and four alerts for the Database between 10:15 and 10:20. As mentioned above, the user/administrator can select the system from where the alert information is displayed. Based on this information, the user/administrator can gain improved insight into the behavior of the selected system and appropriate diagnostic actions to take to improve that system's performance.

An embodiment can then provide a correlation between monitored values and alerts, for example, at the above-discussed example embodiment of a user interface (UI) that can be used as a correlation UI.

Figure 10:
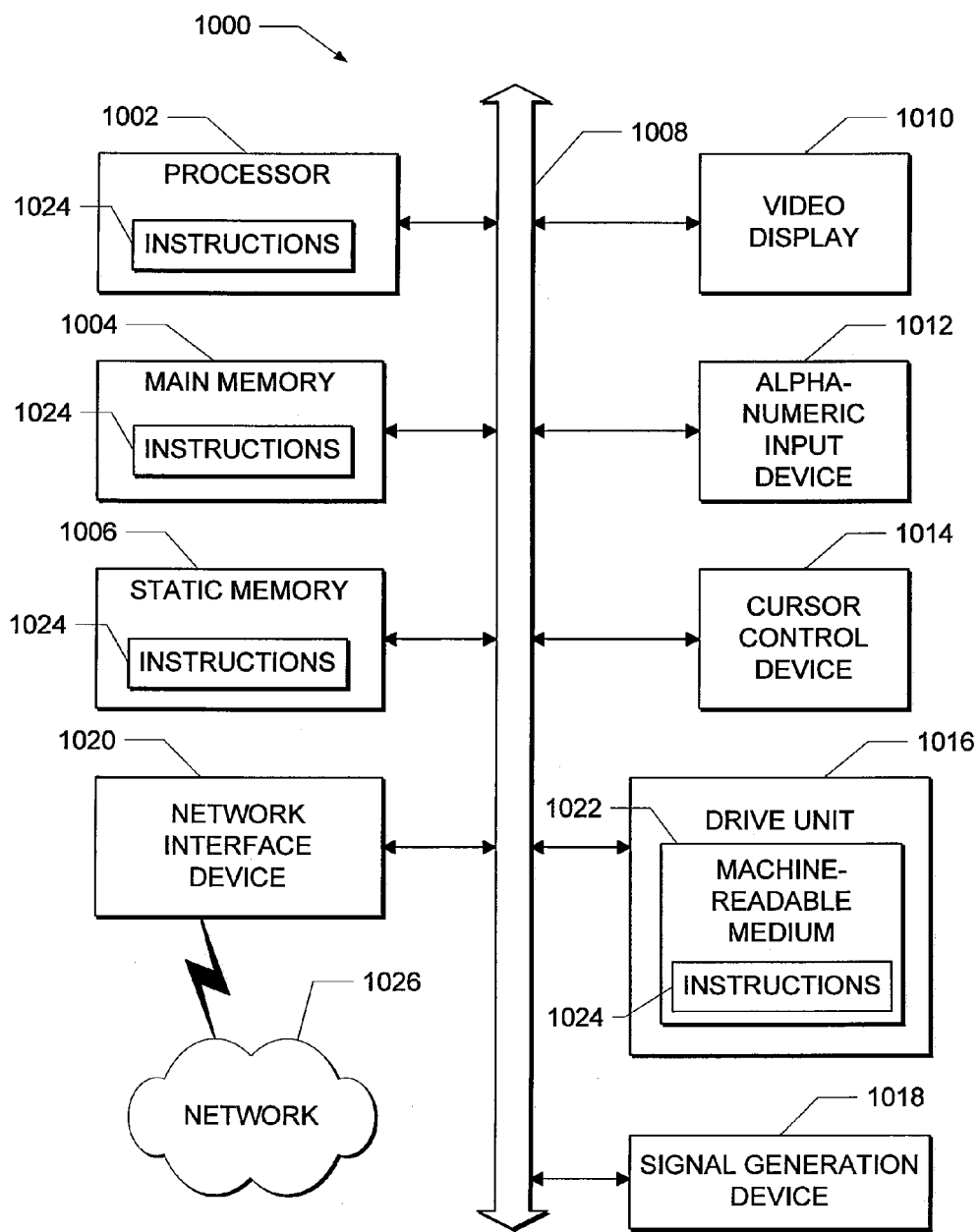
FIG. 10 depicts a block diagram of a machine in the example form of a computing device within which may be executed a set of instructions for causing the machine to perform any one or more of the methodologies discussed herein.

FIG. 10 depicts a block diagram of a machine in the example form of a computing device 1000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The example of the computing device 1000 includes a processor 1002 (e.g., a CPU, a graphics processing unit (GPU), or both), a main memory 1004 (e.g., random access memory) and a static memory 1006 (e.g., static random-access memory), which communicate with each other via a bus 1008. The computing device 1000 may further include a video display unit 1010 (e.g., a plasma display, a liquid crystal display (LCD) or a cathode ray tube (CRT)). The computing device 1000 also includes an alphanumeric input device 1012 (e.g., a keyboard), a UI navigation device, such as cursor control device 1014 (e.g., a mouse), a disk drive unit 1016, a signal generation device 1018 (e.g., a speaker), and a network interface device 1020.

The disk drive unit 1016 (a type of non-volatile memory storage) includes a machine-readable medium 1022 on which is stored one or more sets of data structures and instructions 1024 (e.g., software) embodying or utilized by any one or more of the methodologies or functions described herein. The data structures and instructions 1024 may also reside, completely or at least partially, within the main memory 1004 and/or within the processor 1002 during execution thereof by computing device 1000, with the main memory 1004 and processor 1002 also constituting machine-readable, tangible media.

The data structures and instructions 1024 may further be transmitted or received over a computer network 1026 via network interface device 1020 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 1000) or one or more hardware modules of a computer system (e.g., a processor 1002 or a group of processors) may be configured by software (e.g., an application or application portion) as a hardware module that operates to perform certain operations as described herein. Furthermore, the routines, methods and operations executed to implement the embodiments as described herein, which may be described as software methods, may also be implemented as microcode or other instructions in integrated circuit chips, or may be implemented in the operations of the various transistor circuits or other storage in integrated circuit chips.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1002 configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine, but deployed across a number of machines. In some example embodiments, the processors 1002 may be located in a single location (e.g., within a home environment, an office environment or as a server farm), while in other embodiments, the processors 1002 may be distributed across a number of locations.

While the embodiment(s) is (are) described with reference to various implementations and exploitations, it will be understood that these embodiments are illustrative and that the scope of the embodiment(s) is not limited to them. Many variations, modifications, additions, and improvements are possible.

In general, the routines executed to implement the embodiments discussed herein may be implemented as part of an operating system or a specific application, component, program, object, module or sequence of instructions referred to as "computer programs." The computer programs typically comprise one or more instructions set at various times in various memory and storage devices in a computer that, when read and executed by one or more processors in a computer, cause the computer to perform operations to execute elements involving the various aspects of the embodiments. Moreover, while the embodiments have been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually effect the distribution. Examples of signal bearing media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links. Furthermore, the routines, methods and operations executed to implement the embodiments may be implemented as microcode or other instructions in integrated circuit chips, or may be implemented in the operations of the various transistor circuits in integrated circuit chips.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of correlating, for at least one managed system, over a time period, a plurality of monitored computer metrics and a plurality of associated alerts, the method comprising:
   using a computer processor,
   detecting a selection of a monitored computer metric by a user,
   detecting a selection of a plurality of time periods by the user;
   detecting a selection of a plurality of alerts associated with the monitored computer metric, the plurality of alerts selected by the user;
   storing the detected monitored computer metric, the detected time period, and the detected plurality of alerts;
   correlating the stored monitored computer metric and the stored plurality of alerts over the stored selected plurality of time periods;
   constructing a graph which displays the correlated monitored computer metric superimposed graphically with a representation of a number of alerts per time period of the plurality of alerts over the plurality of time periods, the representation comprising summed up alerts, of the plurality of alerts, stacked one on top of another;

routing the plurality of alerts to a component of a user interface of a client machine for presentation to the user, the component including an inbox where all alerts are visible; and transmitting a signal representing an image of the graph to the client machine for presentation to the user.

2. The method of claim 1, wherein the correlating is performed using a calculation engine.

3. The method of claim 1, further comprising transmitting the selected monitored computer metric and the selected at least one alert to a client machine for correlation over the plurality of time periods.

4. The method of claim 1, wherein the component of the user interface includes at least one of: an email receiver, an SMS/text receiver, and a third party alert inbox visible to a party other than, or in addition to, the user.

5. The method of claim 1, wherein the selection of the monitored computer metric and the selection of the alert are performed by a design time component that describes monitoring meta data.

6. One or more non-transitory computer-readable storage devices having embedded therein a set of instructions which, when executed by one or more processors of the computer causes the computer to execute operations for correlating over a time period, for at least one managed system, a plurality of monitored computer metrics and a plurality of associated alerts, the operations comprising:

using a computer processor, detecting a selection of a monitored computer metric by a user, detecting a selection of a plurality of time periods by the user;

detecting a selection of a plurality of alerts associated with the monitored computer metric, the plurality of alerts selected by the user;

storing the detected monitored computer metric, the detected time period, and the detected plurality of alerts;

correlating the stored monitored computer metric and the stored plurality of alerts over the stored selected plurality of time periods;

constructing a graph which displays the correlated monitored computer metric superimposed graphically with a representation of a number of alerts per time period of the plurality of alerts over the plurality of time periods, the representation comprising summed up alerts, of the plurality of alerts, stacked one on top of another;

routing the plurality of alerts to a component of a user interface of a client machine for presentation to the user, the component including an inbox where all alerts are visible; and transmitting a signal representing an image of the graph to the client machine for presentation to the user.

7. The one or more computer-readable storage devices of claim 6, wherein the correlating is performed using a calculation engine.

8. The one or more computer-readable storage devices of claim 6, wherein the component includes at least one of: an email receiver, an SMS/text receiver, and a third party alert inbox visible to a party other than, or in addition to, the user.

9. The one or more computer-readable storage devices of claim 6, wherein the selection of the monitored computer metric and the selection of the at least one alert is performed by a design time component that describes monitoring meta data.

10. The one or more computer-readable storage devices of claim 6, the operations further comprising transmitting the selected monitored computer metric and the selected at least one alert to a client machine for correlation over the plurality of time periods.

11. A computing system comprising:

at least one processor; and a memory in communication with the at least one processor, the memory being configured to store a correlating module for correlating, over a time period, a monitored computer metric and a number of alerts associated with the monitored computer metric, the correlating module having instructions that when executed by the at least one processor cause operations to be performed, the operations comprising:

detecting a selection of a monitored computer metric by a user, detecting a selection of a plurality of time periods by the user;

detecting a selection of a plurality of alerts associated with the monitored computer metric, the plurality of alerts selected by the user;

storing the detected monitored computer metric, the detected time period, and the detected plurality of alerts;

correlating the stored monitored computer metric and the stored plurality of alerts over the stored selected plurality of time periods;

constructing a graph which displays the correlated monitored computer metric superimposed graphically with a representation of a number of alerts per time period of the plurality of alerts over the plurality of time periods, the representation comprising summed UP alerts, of the plurality of alerts, stacked one on to of another;

routing the plurality of alerts to a component of a user interface of a client machine for presentation to the user, the component including an inbox where all alerts are visible; and transmitting a signal representing an image of the graph to the client machine for presentation to the user.

12. The computing system of claim 11, the operations further comprising transmitting the selected monitored computer metric and the at least one alert to a client machine for correlation over the designated plurality of time periods.

13. The system of claim 11, wherein the component of the user interface includes at least one of: an email receiver, an SMS/text receiver, and a third party alert inbox visible to a party other than, or in addition to, the user.

* * * * *